United States Patent

Yanagi et al.

[15] 3,648,580

[45] Mar. 14, 1972

[54] ELECTRONIC SHUTTER AND A CIRCUIT THEREFOR

[72] Inventors: Akio Yanagi; Shoichiro Kakuta, both of Osaka, Japan

[73] Assignee: Minolta Camera Kabushiki Kaisha, Osaka, Japan

[22] Filed: June 12, 1970

[21] Appl. No.: 45,774

Related U.S. Application Data

[63] Continuation-in-part of Ser. No. 578,722, Sept. 12, 1966, Pat. No. 3,533,348.

[52] U.S. Cl. ....................95/10 CT

[51] Int. Cl. ....................G03b 7/08

[58] Field of Search ....................95/10 CE, 10 CT

[56] References Cited

UNITED STATES PATENTS 3,324,779 6/1967 Noliusawal et al. ....................95/10 X

*Primary Examiner*—Samuel S. Matthews
*Assistant Examiner*—Michael L. Gellner
*Attorney*—Waters, Roditi, Schwartz & Nissen

[57] ABSTRACT

An electric shutter circuit for a single lens reflex camera includes a photoelectric cell positioned to receive light from an object passing through a photographic lens, a capacitor for memorizing the intensity of the light, and resistors connected to the photoelectric cell to charge the capacitor with a voltage inversely proportional to the logarithm of the value of the intensity of the light. A field effect transistor is provided which detects the memorized voltage of the capacitor without affecting this voltage. An RC integrating circuit is connected to the field effect transistor and includes an integrating capacitor, a correcting resistor and a transistor, the resistance between the output terminals of the transistor being proportional to the detecting voltage. An electromagnetic mechanism, including an electromagnetic coil, is connected to the output terminal of a transistor switching circuit for closing the shutter when the voltage of the integrating reaches a predetermined level.

4 Claims, 7 Drawing Figures

FIG. 1
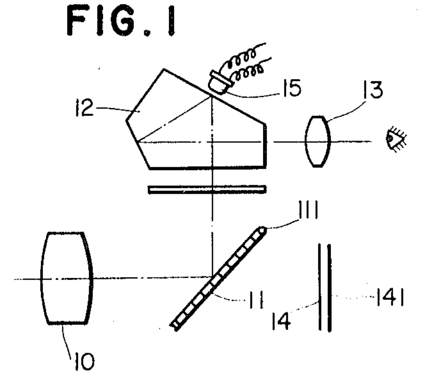
FIG. 2a PRIOR ART
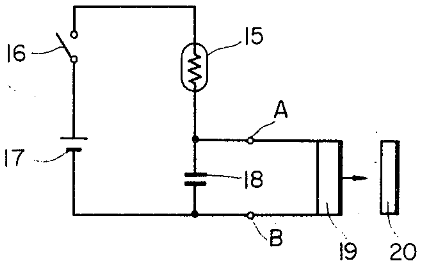
FIG. 2b PRIOR ART
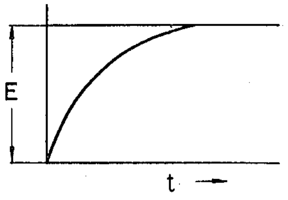
FIG. 5
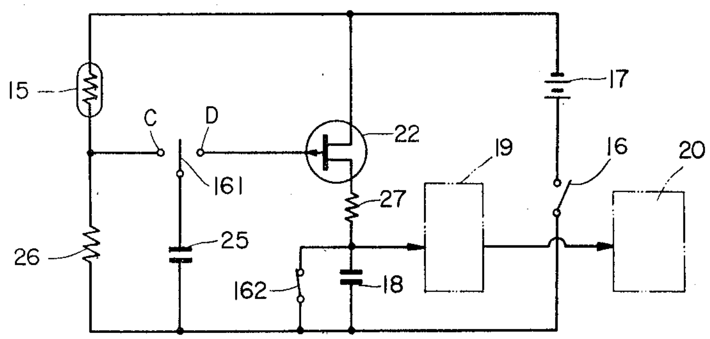
FIG. 3
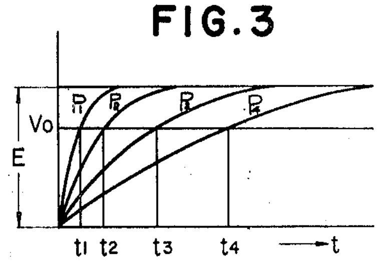
FIG. 6
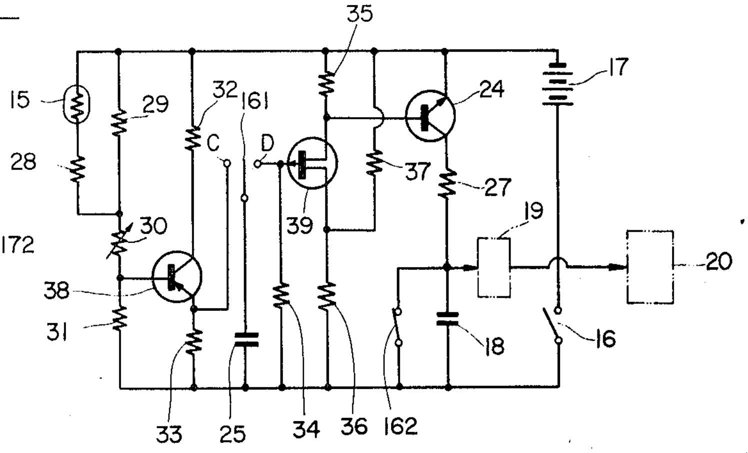
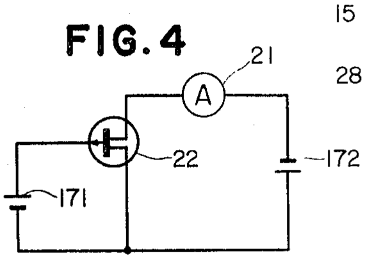

ELECTRONIC SHUTTER AND A CIRCUIT THEREFOR

CROSS-RELATED APPLICATION

This application is a continuation-in-part of our earlier application Ser. No. 578,722 filed Sept. 12, 1966 now U.S. Pat. No. 3,533,348.

BRIEF SUMMARY OF THE INVENTION

This invention relates to an electronic shutter and a circuit therefor, and more particularly, an electronic shutter to be used in a single-lens reflex camera in which a photoelectric cell is disposed so as to receive light passing through a photographing lens, the light beam impinging on the photoelectric cell being intercepted when the film is being exposed.

Before now there have been proposed and manufactured many types of electric shutters for cameras wherein for controlling exposure time, a delay circuit is provided which comprises a RC integrating circuit and a transistor switching circuit connected thereto, said RC integrating circuit consisting of a photoelectric element which changes its resistance value corresponding to the brightness of the photographing subject, and a capacitor connected in series to said photoelectric element. In said electric shutter, charging of the capacitor is started upon the opening movement of the shutter, and when the voltage of the capacitor reaches a certain value after a time period to be determined according to the electrostatic capacity of the capacitor and the resistance of the photoelectric element, the transistor switching circuit is actuated to energize a magnetic mechanism, whereupon a shutter closing member is actuated. In other words, in said electric shutter, a quantity of electricity proportional to a time-integrated intensity of light beam impinging upon the film during the time the shutter is opened, is charged in the capacitor as soon as the film exposure is started, and after film exposure is completed the shutter is automatically closed. Therefore, in accordance with such electric shutter, it is always possible to effect photographing with proper exposure without difficulty in operation, and it is not necessary to use a galvanometer, the construction of which is very delicate and subject to breakage. Furthermore, such shutter circuit is simple and is capable of disposing most of the electrical parts in any portion of the camera body.

On the other hand, there has recently come into use a system for a single lens reflex camera, wherein the brightness of the photographing subject is measured by means of a photoelectric cell which receives the light beam passing through the photographing lens (so called through-the-lens measuring system). This system has the advantage that the photoelectric cell will always receive light equal to or proportional to that of the light passing through the photographing lens and be used for film exposure. Therefore, the system is particularly usable in a camera in which the photographing lenses are interchangeable. However, most single lens reflex cameras having the through-the-lens measuring system as mentioned above, is often so constructed that the light beam impinging on the photoelectric cell may be intercepted when the film is being exposed.

Therefore, it is impossible in such camera to employ the electric shutter as mentioned above.

For automatically controlling an exposure time in such camera, it is necessary to memorize the brightness of a photograph subject which is detected just before the light beam to the photoelectric cell is intercepted.

There have been proposed devices for memorizing the brightness by means of mechanical or electrical means. But such devices sometimes use a galvanometer, the construction of which is very delicate and subject to breakage. Furthermore, in the known devices, the applicable range of the brightness of the photographing subject has been very limited due to the construction of the circuit thereof. Such devices are not practical for actual use.

Therefore, it is an object of the present invention to provide an operative and robust electric shutter circuit for a camera having the through-the-lens measuring system, wherein the brightness of the photograph subject, just before the light beam to a photocell is intercepted, is memorized as a voltage valve during the time when the film is being exposed and the photocell is intercepted from the light beam, and the time period of the film exposure is automatically controlled in conjunction with said memorized voltage through a delay circuit and an electromagnet means.

Another object of the present invention is to provide a circuit for the electric shutter for the single lens reflex camera whereby the film exposure is accurately controlled in proportion to very wide ranges of brightness of the photograph subject.

BRIEF DESCRIPTION OF THE DRAWING

FIG. 1 is a diagrammatic illustration of the optical system in a single-lens reflex camera having a focal plane shutter;

FIG. **2*a*** is an electric circuit diagram, showing the elements of an integrating circuit for determining the shutter speed of an electronic shutter;

FIG. **2*b* is a curve representing the integrating characteristics of the circuit of FIG. 2*a***;

FIG. 3 shows curves similar to that of FIG. **2*b***, illustrating the variation of the integrating characteristics when a resistance is changed while keeping a constant value of the capacitance of a condenser;

FIG. 4 is a circuit diagram including a conventional field effect transistor resistance in conjunction with an ammeter;

FIG. 5 is a circuit diagram of an electronic shutter control circuit embodying the invention; and FIG. 6 is a similar view of another embodiment of the invention.

DETAILED DESCRIPTION

Referring to FIG. 1 showing the optical system of a single-lens reflex camera using a so-called through-the-lens measuring system for measuring the brightness of the light beam passing through the photographing lens, the light from the photographic subject is reflected by a mirror 11 after passing through the photographing lens 10, and then one part thereof is delivered to the eye through a prism means 12 and an eyepiece 13 and another part impinges on a photoelectric element 15. As the mirror 11 is pivoted in a clockwise direction around its pivot shaft 111, the light beam proceeding toward the photoelectric element 15 is interrupted, and at the same time a leading shutter screen 14 is moved to expose the film to the image of the subject.

The film exposure is controlled by a shutter closing member (not shown) operated by a circuit such as that in FIG. **2*a*. In FIG. 2*a*, when the shutter closing member is opened in response to actuation of a shutter button (not shown) a switch 16 is closed to complete a circuit extending from an electric power source 17, through the switch 16, a photoelectric element 15 to act as a variable resistance responsive to the quantity of light received thereby, and an integrating capacitor 18 to determine the duration of exposure, and back to the electric power source 17. Thus, charging of the capacitor 18 is started. The voltage across the capacitor 18** will be increased according to the following formula responsive to the above charging.

$$V=E(1-e^{t/CR}) \tag{1}$$

wherein, $V$ is the instantaneous voltage across the capacitor 18

$E$ is the terminal voltage of the electric power source 17

$e$ is the base of the natural system of logarithms $C$ is the capacitance of the capacitor 18

$R$ is the resistance of the photoelectric element 15

$t$ is the time.

Thus, the voltage across the terminals A, B of the capacitor 18 increases in proportion to charging time, and finally up to the same value as the terminal voltage $E$ of the electric power source 17 and the capacitor is saturated thereat if the switch 16 is kept closed (see FIG. 2*b*).

If the resistance $R$ of the photoelectric element 15 is increased, then the slope of the curve of FIG. 2*b* is gradually reduced, as shown by curves $P_1$ to $P_4$ in FIG. 3. Accordingly, the time necessary for the terminal voltage $V$ of the capacitor 18 to increase from zero to a predetermined level, e.g., $V_o$, is gradually increased, as shown by $t_1$ to $t_4$ in FIG. 4. In other words, the magnitude of the resistance of the photoelectric element 15 can be represented by the time for the terminal voltage $V$ of the integrating capacitor 18 to increase from zero to a certain predetermined value.

When the voltage of the capacitor 18 reaches the predetermined level, a transistor switching circuit 19 of a delay circuit, which comprises the circuit 19 and a time-integrating circuit including the photoelectric element 15 and the capacitor 18 connected in series thereto, is energized to actuate an electromagnetic mechanism 20, whereupon the shutter closing member (not shown) is closed.

If the intensity of the light beam received by the photoelectric element is assumed to be L lux, then the following relation exists between the resistance R of the photoelectric element and the intensity L of the light beam.

$$R=K_1L^{-1} \quad (2)$$

wherein, $K_1$ is a constant.

The following formula may be obtained from formula (1), $$t=CR \text{ in } ((E-Vo)/E)^{-1} \quad (3),$$

and by substituting the formula (2) in the formula (3), the following formula is obtained, $$t=CK_1\,L^{-1}\,K_2,$$

wherein, $$K_2=\ln((E-Vo)/E)^{-1}$$

Hence, $$t=KL^{-1} \quad (4),$$

wherein, $$K=CK_1K_2.$$

Therefore, the time necessary for the integrating capacitor voltage to reach a certain voltage is approximately proportional to the resistance of the photoelectric element, and the resistance of the photoelectric element is in turn approximately proportional to the brightness of the object to be photographed. Thus, it is possible to obtain a proper exposure time which is proportional to the brightness of the photographic subject.

As described hereinbefore with respect to the electronic shutter, despite the fact that the photoelectric element should be subjected to the light beam during the film exposure, according to the through-the-lens measuring system of a single lens reflex camera, upon rotation of the mirror, the light beam to the photoelectric element is interrupted and the screens are removed to expose the film. Consequently, it is necessary to provide a certain means to memorize the quantity of light measured by the photoelectric element to enable setting to a proper exposure time responsive to said quantity of light.

FIG. 4 shows an electric circuit including a conventional field effect transistor in conjunction with an ammeter, and numeral 22 is a field effect transistor, 171 a power source for the transistor base voltage, and 172 an electric power source. The following relation exists between the voltage $E_1$ (volts) of the electric power source 171, the internal resistance $R_1$ (ohms) of the transistor 22, and the current $i$ (amperes) flowing through the collector of the field effect transistor 22.

$$i=E_1/K_1$$

The transistor has such characteristics that the current $i$ is proportional to the base voltage, and hence the internal resistance $R_1$ of the transistor is proportional to the base voltage. Accordingly, if $R_1$ is substituted by R of the formula (3), then there will be proportionality between $t$ and $R_1$. Hence, in order to fulfill the automatic operation of a focal plane shutter, it is sufficient to establish a light measuring circuit in which the base voltage is proportional to the brightness of the quantity of light of the photographic object. Furthermore, as the input impedance of the field effect transistor 22 is extremely high, when a capacitor charged at a certain voltage level is used for obtaining the gate voltage in said transistor instead of obtaining it from the power source 171, the electric potential of the capacitor is maintained in a pre-charged level.

Referring now to FIG. 5 illustrating a fundamental circuit of the present invention, numeral 26 represents a resistor connected in series with the photoelectric cell 15 disposed to receive light from the photographing subject through the photographing lens, 17 and 16 representing respectively an electric power source and a power source switch which is closed upon depression of a shutter button (not shown), 161 representing a changeover switch which is adapted to contact terminal C when the shutter button (not shown) is depressed through part of its stroke, the switch 161 being adapted to be switched to contact terminal C just before the light beam to the photoelectric cell 15 is intercepted, and being further adapted to contact terminal D during the latter part of the stroke of the shutter button and maintain its contact with the terminal D during the film exposure, 25 representing a capacitor which is charged by the voltage impressed across the resistor 26 when the selective switch 161 is in contact with the terminal C, 22 representing a field effect transistor having the character as said above, 27 representing a correcting resistor, 18 representing an integrating capacitor which forms an integration circuit together with the resistance between the collector and the source of the field effect transistor 22, 162 representing a switch for short-circuiting the storage capacitor 18, numeral 19 representing a transistor switching circuit such as a Schmidt trigger circuit, 20 representing a mechanism having an electromagnet (not shown) adapted to activate the closing member of the shutter upon the closing of the power source switch 16, and to release the closing member of the shutter by the actuation of the transistor switching circuit 19.

The operation of the electronic shutter of FIG. 5 will now be described in further detail hereinafter.

When the shutter button (not shown) of the camera is depressed, the power source switch 16 is closed and simultaneously the changeover switch 161 contacts terminal C. Then, a part of the voltage of the electric power source 17, that is, the induced terminal voltage of the resistor 26 determined by the photoresistance value of the photoelectric cell which is in proportion to the intensity of the light beam passing through the photographing lens and impinging upon the photoelectric cell 15, will be charged in the capacitor 25. In other words, a voltage proportional to the intensity of the light beam impinging upon the electric cell 15 will be stored in the capacitor 25. As the aforementioned shutter button is further depressed, the changeover switch 161 is switched to contact the terminal D by a known mechanism and simultaneously the mirror (FIG. 1) is pivoted in the clockwise direction around the axis 111 (FIG. 1), the lens aperture is set at the predetermined value, the leading shutter screen is moved, and the switch 162 connected in parallel with the capacitor 18 is switched to open the circuit. Consequently, one end of the capacitor 25 is connected to the gate of the field effect transistor 22. However, the electric charge stored in the capacitor 25 will not be charged, since the input impedance of the field effect transistor 22 is extremely high as stated above. Thus, the voltage proportional to the intensity of the light beam impinging upon the photoelectric cell 15 is retained or memorized in the capacitor 25. This memorized voltage produces an internal resistance in proportion to the voltage between the collector and the source of the field effect transistor 22. This internal resistance forms the RC integration circuit together with the integrating capacitor 18. In this RC integrating circuit, when the value of the voltage of the integrating capacitor 18 reaches a predetermined level after a time period, whose duration is determined by said internal resistance and the electrostatic capacity of the integrating capacitor 18 which is inversely proportional to the brightness of the photographing subject, the transistor switching circuit 19 is actuated to actuate the electromagnetic mechanism 20 so that the rear shutter screen is driven to terminate the film exposure, and simultaneously the mirror 11, the lens aperture and the switches 16, 161 and 162 are respectively returned to their initial position.

Generally speaking, it is necessary to provide a time period including an exposure time ranging from 1 millisecond to 1 second, plus a certain time lag for the time when the leading shutter screen is driven and the time when the lagging shutter screen is driven. According to this particular embodiment, the resistor 27 is inserted in series with the integrating capacitor 18 to compensate for the aforementioned time lag in the range of 6.1 milliseconds to 1 second.

As described in the foregoing explanation with respect to FIG. 5, in the electronic shutter of the invention, the quantity of light received by the photoelectric element from a photographic subject is memorized as an electric quantity to provide a proper exposure time responsive to the brightness of the photographic object. Thus, it is made possible to employ an electronic shutter on a single lens reflex camera, using the so-called through-the-lens measuring system.

FIG. 6 illustrates another embodiment of the invention which is generally similar to the preceding embodiment shown in FIG. 5, and only the differences between the two embodiments will be described hereinafter.

In order to achieve the best overall brightness-resistance characteristics, resistors 28 and 29 are connected to the photoelectric element 15, as shown in FIG. 6. To represent the sensitivity of the film to be used and the degree of lens aperture selected, a variable resistor 30 and a resistor 31 are connected in series as shown in the figure. The voltage across the resistor 31, which represents a properly divided portion of the voltage of the power source 17, is applied to the base terminal of an amplifying transistor 38 having operating resistors 32 and 33. The terminal voltage of the resistor 33 depends on the current flowing in the emitter of the transistor 38 and is applied to the capacitor 25 through the selective switch 161 to charge the capacitor 25 to a saturated voltage. When the switch 161 contacts the terminal D, the mirror 11 is rotated. Furthermore, the selective switch 161 is so actuated as to complete the circuit between the capacitor 25 and the terminal D to apply the voltage of the capacitor 25 to the gate terminal of the field effect transistor 39 having operating resistors 34, 35, 36 and 37. The field effect transistor 39 is adapted to have a resistance approximately inversely proportional to the value of the base voltage and to consume practically no gate current. The collector voltage of the field effect transistor 39 is applied to the base terminal of an amplifying transistor 24. The resistor 27 and the integrating capacitor 18 are connected in series with the transistor 24, as illustrated in FIG. 6.

It is well known that the relation between an intensity I of light impinging on the photoelectric element and a photoresistance R of said photoelectric element is represented by the following equation:

$$R = K \cdot I^{-\gamma}$$

The characteristic of the relation of the light intensity $I$ to the photoresistance $R$ is shown in a logarithmic graph as being linear and inclined downward to the right, wherein $\gamma$ is the slope of the linear function with respect to the absissa. Furthermore, it is also known that the light intensity I varies with the photoresistance $R$ by a geometrical progression order.

Thus, according to the embodiment of the present invention as shown in FIG. 6, there are provided correction resistors 28,29 connected to the photoelectric element 15 so that the combined resistance Rco of the photoelectric element 15 and the correction resistors 28,29 may fulfill the following expression relative to the light intensity I, $$R\text{co} = K' \cdot 1/\log I$$

It will be understandable from this expression that the combined resistance $R$co is in inverse proportion to the logarithm of the light intensity $I$. A split voltage of the electric power source 17 corresponding to said combined resistance $R$co, is amplified by the transistor 38 to be memorized by the capacitor 25. When changing over the switch 161 to contact to the terminal D, there flows in the collector of the field effect transistor 39, electric current proportional to the voltage impressed on the gate of the transistor 39, namely, the voltage memorized in the capacitor 25. There may be impressed across the resistor 35 a voltage proportional to said electric current. The input voltage of the transistor 24, the base voltage of which is the terminal voltage across the resistor 35, is to be in proportion to the logarithm of the output current thereof. Therefore, the collector current of the transistor 24 for charging the integrating capacitor 18 is in proportion to the intensity of the light impinging upon the photoelectric element and the time necessary for charging the integrating capacitor 18 up to the predetermined level is in inverse proportion to said impinging light intensity.

Consequently, it will be appreciated that it is possible to properly and automatically control the exposure time in a considerably wide range of brightness of the photographing subject, and furthermore, to memorize the voltage correctly for either bright photographing subjects or dark ones, while smaller capacity capacitors are sufficient, according to the present invention.

The invention has been described with reference to particular embodiments, however, it should be understood that the invention is not limited to the specific embodiments and that various modifications and variations are possible without departing from the spirit and scope of the invention.

What is claimed is:

1. An electric shutter circuit for a single lens reflex camera, comprising a photoelectric cell positioned to receive light from an object passing through a photographic lens, a capacitor for memorizing the intensity of the light, means coupled to said photoelectric cell so as to charge the capacitor with a voltage inversely proportional to a logarithm of the value of the intensity of said light, a field effect transistor which detects said memorized voltage of said capacitor, an RC integrating circuit including an integrating capacitor, a correcting resistor, and a transistor, the resistance of which between the output terminals thereof is proportional to the detected voltage of the field effect transistor, a switch connected in parallel with said integrating capacitor and opened in relation to opening movement of the shutter, a transistor switching circuit actuated by said RC integrating circuit, and an electromagnetic mechanism connected to said transistor switching circuit at the output thereof for closing the shutter when the voltage of the integrating capacitor reaches a predetermined level.

2. An electric shutter circuit as claimed in claim 1, wherein said means comprises resistors arranged respectively in series with and in parallel with the photoelectric cell.

3. An electric shutter circuit as claimed in claim 1, wherein said shutter is a focal plane shutter with front and rear screens, the integrating capacitor commencing charging in relation to the opening movement of the front screen, and when the voltage of said integrating capacitor reaches said predetermined level, the rear screen is released to terminate the film exposure by the actuation of the transistor switching circuit and the electromagnetic mechanism.

4. An electric shutter circuit as claimed in claim 1, wherein the resistance between the emitter and collector of said second transistor is used as a variable resistance for the RC integrating circuit, and further comprising resistors for correction of the characteristic of the photoelectric cell and for adjusting the shutter circuit in accordance with photographic conditions, and a circuit for amplifying voltage to be memorized in the capacitor.

* * * * *